US006819492B1

(12) United States Patent
Picard et al.

(10) Patent No.: US 6,819,492 B1
(45) Date of Patent: Nov. 16, 2004

(54) TUNEABLE ACTIVE MICROCAVITY AND RELATED METHOD FOR MAKING SAME

(75) Inventors: Emmanuel Picard, St Martin d'Uriage (FR); Emmanuel Hadji, Fontaine (FR)

(73) Assignee: Commissariat a l'Energie Atomique, Paris (FR)

( * ) Notice: Subject to any disclaimer, the term of this patent is extended or adjusted under 35 U.S.C. 154(b) by 106 days.

(21) Appl. No.: 10/110,201
(22) PCT Filed: Oct. 27, 2000
(86) PCT No.: PCT/FR00/03006
§ 371 (c)(1), (2), (4) Date: Apr. 17, 2002
(87) PCT Pub. No.: WO01/31755
PCT Pub. Date: May 3, 2001

(30) Foreign Application Priority Data
Oct. 29, 1999 (FR) .............................. 99 13590

(51) Int. Cl.[7] .............................................. G02B 27/00
(52) U.S. Cl. ........................ 359/579; 359/260; 372/107
(58) Field of Search ................................ 359/260, 579, 359/224; 372/98–107; 356/519

(56) References Cited

U.S. PATENT DOCUMENTS

| 3,582,212 | A | * | 6/1971 | Hesse et al. ................ 356/519 |
| 4,547,801 | A |   | 10/1985 | Haisma et al. ............. 378/48.3 |
| 5,039,201 | A | * | 8/1991 | Liu ............................ 359/589 |
| 5,349,596 | A | * | 9/1994 | Molva et al. .................. 372/43 |
| 5,353,262 | A | * | 10/1994 | Yakymyshyn et al. ....... 367/149 |
| 5,933,444 | A |   | 8/1999 | Molva et al. ................. 372/75 |

FOREIGN PATENT DOCUMENTS

FR        2 757 319        6/1998

* cited by examiner

*Primary Examiner*—Mark A. Robinson
*Assistant Examiner*—Alessandro Amari
(74) *Attorney, Agent, or Firm*—Oblon, Spivak, McClelland, Maier & Neustadt, P.C.

(57) ABSTRACT

A tuneable active microcavity and a process for manufacturing a tuneable active microcavity. The microcavity includes a first mirror, a second mirror, and a layer of an active material. A piezoelectric actuator placed outside the space located between the first and second mirrors modifies the relative distance separating the first and second mirrors under action of a control signal. The piezoelectric actuator includes a first face rigidly connected to the first mirror and a second face rigidly connected to the second mirror such that each of the first and second mirrors is free to move under action of the control signal applied to the piezoelectric actuator.

11 Claims, 2 Drawing Sheets ns in the cavity makes use of piezoelectric elements.

TUNEABLE ACTIVE MICROCAVITY AND RELATED METHOD FOR MAKING SAME

DESCRIPTION

Technical Field and Prior Art

The invention relates to a tuneable active microcavity and a process for manufacturing a tuneable active microcavity.

The invention is applicable to many applications including infrared detection and emission.

In general, a cavity is composed of two mirrors separated by a thickness e, regardless of the dimensions of the cavity. The thickness of a cavity satisfies the relation $e=k\lambda/2n$ where $\lambda$ is the resonant wave length, n is the refraction index of the medium between the mirrors and k is an integer. The resonant frequency of the cavity is made tuneable by moving the mirrors with respect to each other.

If the cavity is active, an active material such as CdHgTe is placed between the mirrors.

According to known art, a method of moving the mirrors in a cavity makes use of piezoelectric elements.

A tuneable cavity according to a first embodiment of prior art is described in FIG. 1. The cavity comprises 2 mirrors 1 and 2 and a piezoelectric element 3 included between the two mirrors. The distance between the two mirrors is modified by applying a voltage to the piezoelectric element 3.

The piezoelectric materials cannot be machined to be made very thin. The result is that the cavities obtained using the embodiment according to prior art described in FIG. 1 have a minimum thickness of the order of one millimeter. It is then no longer possible to make microcavities, in other words cavities with a thickness of the order of one micron.

A tuneable cavity according to a second embodiment of prior art is shown in FIG. 2.

According to this second embodiment, a piezoelectric actuator external to the cavity is used to vary the thickness of the cavity.

The tuneable cavity includes two mirrors 1 and 2, a piezoelectric actuator 4, a support arm 5 and a fixed support 6. The piezoelectric actuator 4 is located outside the cavity defined by mirrors 1 and 2.

A first mirror (mirror 1 in FIG. 2) is fixed to the support 6. The second mirror (mirror 2) is fixed to the piezoelectric actuator 4, which is fixed to a first end 5A of the support arm 5, the second end 5B being fixed to the support 6. The mirrors 1 and 2 are placed facing each other to form the cavity.

The mirror 2 can be moved with respect to mirror 1 under the action of a voltage applied to the piezoelectric actuator, thus inducing a change in the frequency of the cavity. This type of device has reference problems. It is not easy to precisely adjust the position of the mirror 2 with respect to the position of the mirror 1 located on the fixed support 6. The precision with which the mirror 2 can be positioned with respect to the mirror 1 is not better than approximately one millimeter. It is then only possible to make cavities with a minimum thickness of the order of one millimeter.

Therefore, it is also impossible to make tuneable microcavities according to this second embodiment.

However, tuneable microcavities are known elsewhere. One of the two mirrors in the microcavity is then placed on a deformable membrane. However, the membranes used are not very deformable. In this case, the tuneable frequency band is not very wide. For example, the tuneable band is typically 5% for a central wave length of 1 $\mu$m.

The invention does not have the above disadvantages.

The invention relates to a tuneable active microcavity comprising a first mirror, a second mirror and a layer of active material between the two mirrors, characterized in that the tuneable microcavity comprises:

a piezoelectric actuator with a first face fixed to the first mirror, a mechanical structure fixed to the second mirror, mechanical connecting means, fixed firstly to a second face of the piezoelectric actuator such that the piezoelectric actuator is outside the space between the first and second mirrors, and secondly to the mechanical structure so as to put the first and second mirrors approximately parallel to each other and at a predetermined distance from each other, each of the two mirrors being free to move under the action of a control signal applied to the piezoelectric actuator.

The invention also relates to a process for manufacturing a tuneable active microcavity including a first mirror, a second mirror and a layer of active material between the two mirrors, characterized in that it comprises the following steps:

fix the first mirror to a first face of a piezoelectric actuator so as to form a first assembly, rigidly assemble an assembly composed of the second mirror and the layer of active material with a mechanical structure in order to create a second assembly, move the first assembly and the second assembly with respect to each other such that the piezoelectric actuator is outside the space located between the mirrors and that the two mirrors are approximately parallel to each other and located on each side of the layer of active material, fix the mechanical structure to a second face of the piezoelectric actuator using mechanical connecting means (14, 15), when the two mirrors are at a predetermined distance from each other.

One advantage of the invention is that it enables a very precise adjustment of the relative position of the mirrors that form the microcavity.

It is then possible to make a tuneable microcavity with a thickness of the order of a few microns, for example of the order of 2 to 5 $\mu$m. This type of device can advantageously detect gases with absorption bands in the medium infrared (2–5 $\mu$m). The wave length can be tuned over several hundred nanometers.

BRIEF DESCRIPTION OF THE FIGURES

Other characteristics and advantages of the invention will become clear after reading a preferred embodiment of the invention made with reference to the appended figures in which.

DETAILED DESCRIPTION OF EMBODIMENTS OF THE INVENTION

The same marks on different figures denote the same elements.

Figure 1:
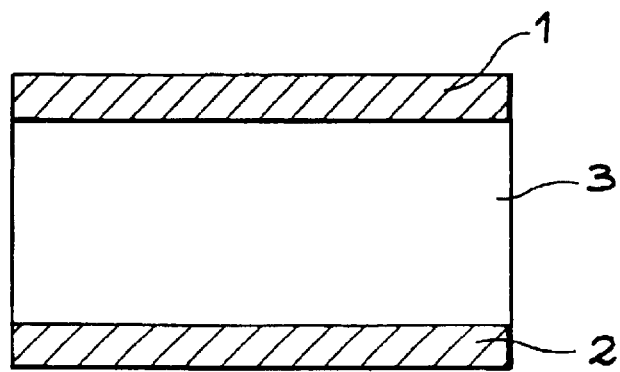
FIG. 1 shows a tuneable cavity made using a first embodiment according to prior art.
Figure 2:
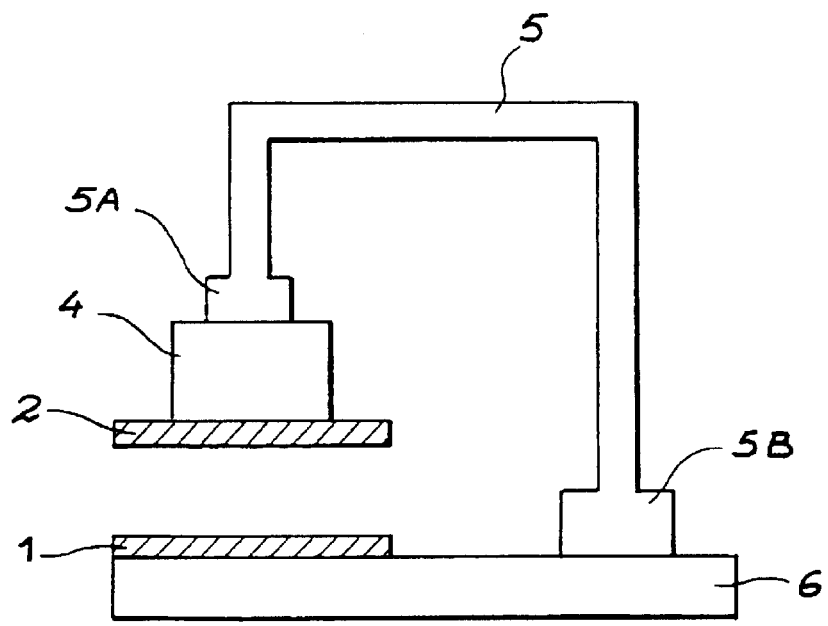
FIG. 2 shows a tuneable cavity made using a second embodiment according to prior art.

FIGS. 1 and 2 have been described above, and therefore there is no point in describing them again.

Figure 3:
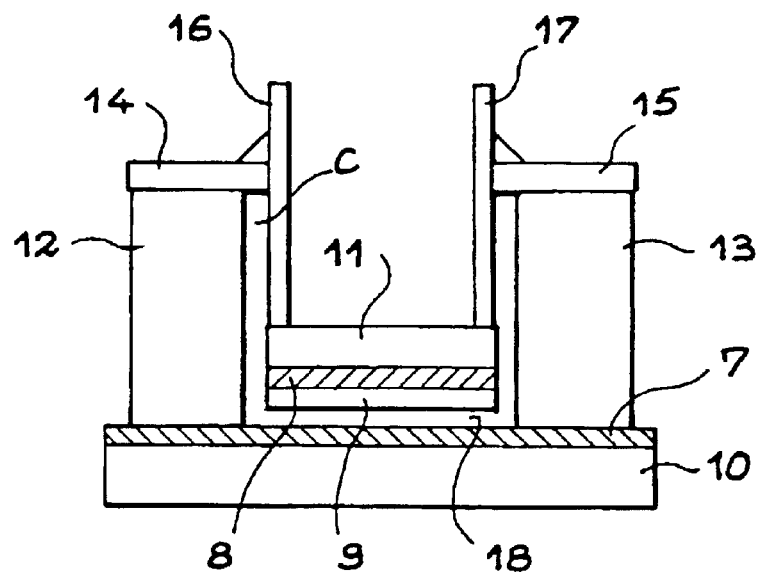
FIG. 3 shows a tuneable microcavity according to the invention.

FIG. 3 shows a sectional view of a tuneable microcavity according to the preferred embodiment of the invention.

The tuneable microcavity according to the preferred embodiment of the invention comprises two mirrors 7 and 8, two silica supports 10 and 11, a layer of active material 9, a piezoelectric actuator 12, 13, a support structure 16, 17 and mechanical connecting means 14, 15.

According to the preferred embodiment of the invention, the piezoelectric actuator 12, 13 is a cylindrical part, for example a cylinder of revolution with a central hole passing through it from side to side, from a first face to a second face.

The process for manufacturing the tuneable microcavity according to the preferred embodiment of the invention will now be described.

Initially, the first mirror 7 is fixed to a first face of the silica support 10 and the second mirror 8 is fixed on a layer active material 9, for example CdHgTe. The layer of active material 9 is then thinned until the required thickness is obtained.

The assembly composed of the active material 9 and the second mirror 8 is then fixed on the second silica support 11, for example by gluing, such that the mirror 8 is located between the active material 9 and the silica support 11.

The support 11, the mirror 8 and the layer of active material 9 are then fixed to the end of the support structure 16, 17.

The process then comprises two main steps. A first step consists of rigidly connecting a first face of the piezoelectric actuator 12, 13 to the assembly consisting of the mirror 7 and the silica support 10. The assembly thus made up has a cavity C, the bottom of which is formed by mirror 7. The second step consists of inserting the support structure 16, 17 into the cavity C so as to bring the first and second mirrors to a predetermined distance from each other and to rigidly connect the support structure 16, 17 and the second face of the piezoelectric actuator using mechanical connecting means 14, 15.

For example, the first and second mirrors may be brought towards each other using a micrometric screw system, a mechanical pressurization system or a piezoelectric type system with a check of the air gap 18 between the mirrors if necessary, for example by optical means.

The support structure 16, 17 and the second face of the piezoelectric actuator are fixed to each other, for example by gluing, crimping or mechanical blockage of the mechanical connecting means 14, 15.

The assembly composed of the support tube 16, 17, the silica support 11, the mirror 8 and the active material 9 is inserted into the cavity C such that the active material 9 is approximately in contact with the mirror 7. The air gap 18 between the two mirrors 7 and 8 is then minimum. The air gap 18 may be of the order of a few $\mu$m, for example.

The support structure is preferably in tubular form 16, 17.

The mechanical connecting means 14, 15 are preferably composed of a plate through which an orifice is drilled with a diameter approximately the same as the diameter of the hole in the tubular support structure 16, 17.

According to the invention, the piezoelectric actuator has a first face connected rigidly to the first mirror 7 of the cavity and a second faces connected rigidly to the second mirror 8 in the cavity. When a voltage is applied to the piezoelectric actuator 12, 13, each of the two mirrors 7 and 8 is subjected to a force that moves it away from the other mirror. The air gap 18 increases. The resonant wave length in the microcavity then increases accordingly.

Advantageously, according to the invention, neither of the two mirrors acts as mechanical reference for the microcavity.

The process according to the invention can be used to give a minimum air gap 18 of the order of one micron with a precision of the same order of magnitude. It is then possible to adjust the relative position of the mirrors by directly controlling the resonant wave length of the microcavity.

A microcavity was made in which the actuator operates at a voltage varying from 0 to 1 kV and that forms an 8 mm high 16 mm diameter tubular part with an 8 mm central hole. A variation of 4 $\mu$m in the length of the microcavity was observed corresponding to a variation of 350 nm in the wave length.

Figure 4:
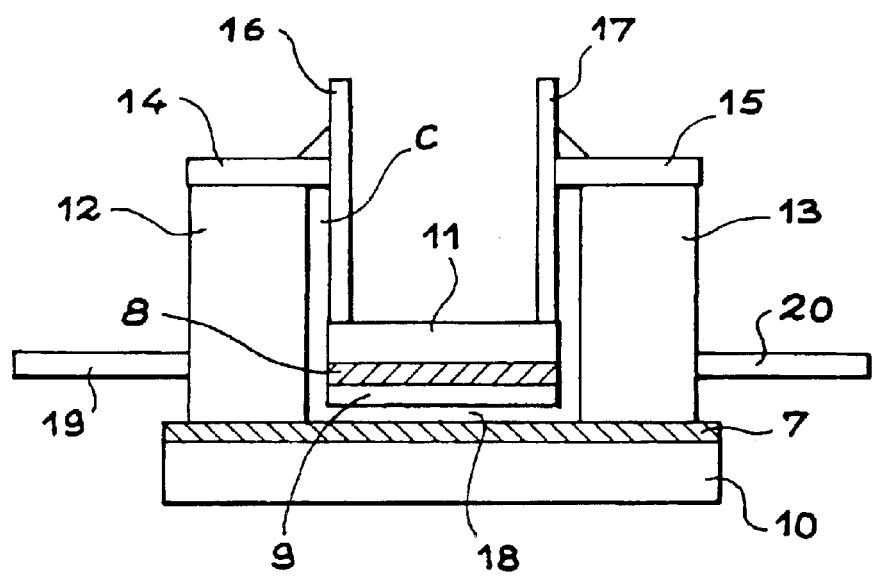
FIG. 4 shows an example of an attachment system for the tuneable microcavity according to the invention.

FIG. 4 shows an example attachment system for the tuneable microcavity according to the invention.

The microcavity is then fixed to the structure surrounding it (not shown in the figure) by a part 19, 20 fixed on the piezoelectric actuator 12, 13. The part 19, 20 is preferably a plate clamped around the piezoelectric actuator.

What is claimed is:

1. Tuneable microcavity comprising:
    a first mirror;
    a second mirror positioned at one end of a mechanical structure;
    a piezoelectric actuator having an openingly between a first face and a second face, said first face being rigidly connected to the first mirror so that the piezoelectric actuator and the first mirror define a cavity, the bottom of which is made of the first mirror, the mechanical structure being inserted in the cavity so that the first and second mirrors are approximately parallel to each other, and
    a mechanical connector separable from the mechanical structure and fixed firstly to the second face of the piezoelectric actuator, and secondly to the mechanical structure to put the first and second mirrors at a predetermined distance from each other,
    wherein the mechanical structure comprises a support on which the second mirror is fixed and a tubular support structure with one end fixed to the support, and wherein the mechanical connector includes a plate with an orifice drilled in the plate with a diameter approximately equal to a diameter of the support structure.

2. Tuneable microcavity according to claim 1, wherein the opening has a circular cross-section.

3. Tuneable microcavity according to claim 1, further comprising a support fixed on a second face of the first mirror.

4. Tuneable microcavity according to claim 1, further comprising a layer of active material placed between the first and the second mirrors.

5. Tuneable microcavity according to claim 4, wherein the active material comprises CdHgTe.

6. Process for manufacturing a tuneable microcavity including a first mirror, a second mirror with a first face fixed to one end of a mechanical structure, a piezoelectric actuator with a first face rigidly connected to the first mirror and with a hollow area in which the mechanical structure is inserted such that the first and second mirrors are placed approximately parallel to each other, comprising:
    attaching a first face of the first mirror directly to the first face of the piezoelectric actuator to form a cavity, a bottom of the cavity composed of the first mirror;

introducing the mechanical structure into the cavity to put the first mirror and the second mirror a predetermined distance from each other; and attaching the mechanical structure to a second face of the piezoelectric actuator using a mechanical connector when the first mirror and the second mirror are at the predetermined distance from each other.

7. Process for manufacturing a tuneable microcavity according to claim 6, wherein the first and the second mirrors are brought towards each other using one of a micrometric screw system, a mechanical pressurization system, or a piezoelectric system.

8. Process for manufacturing a tuneable microcavity according to claim 7, wherein the first mirror and the second mirror are brought towards each other accompanied by an optical check on an air gap between the first and second mirrors.

9. Process for manufacturing a tuneable microcavity according to claim 6, further comprising attaching a support to a second face of the first mirror.

10. Process for manufacturing a tuneable microcavity according to claim 6, further comprising fixing a layer of active material on a second face of the second mirror.

11. Process for manufacturing a tuneable microcavity according to claim 10, wherein the mechanical structure is inserted into the cavity such that the active material is in contact with the first mirror.

* * * * *